(12) United States Patent
Clawges et al.

(10) Patent No.: US 9,182,580 B1
(45) Date of Patent: Nov. 10, 2015

(54) OPTICAL PROBE SYSTEM HAVING ACCURATE POSITIONAL AND ORIENTATIONAL ADJUSTMENTS FOR MULTIPLE OPTICAL OBJECTIVES

(71) Applicant: CheckPoint Technologies, LLC., San Jose, CA (US)

(72) Inventors: Thomas E Clawges, Pleasanton, CA (US); David J Morgan, Boulder Creek, CA (US); Guoqing Xiao, Saratoga, CA (US)

(73) Assignee: CheckPoint Technologies, LLC, San Jose, CA (US)

( * ) Notice: Subject to any disclaimer, the term of this patent is extended or adjusted under 35 U.S.C. 154(b) by 202 days.

(21) Appl. No.: 14/015,484

(22) Filed: Aug. 30, 2013

(51) Int. Cl.
 *G02B 21/24* (2006.01)
 *G02B 21/22* (2006.01)
 *G02B 21/00* (2006.01)

(52) U.S. Cl.
 CPC .................................. *G02B 21/0016* (2013.01)

(58) Field of Classification Search
 CPC ........ G01B 11/00; G01R 31/02; G01R 31/00; G01R 21/01; G01R 21/4738; G01R 21/21; G01R 13/00
 USPC .......... 359/369, 381, 368, 491; 324/754, 537, 324/724, 719
 See application file for complete search history.

(56) References Cited

U.S. PATENT DOCUMENTS

| | | | |
|---|---|---|---|
| 7,170,694 B2 * | 1/2007 | Zimmermann et al. | 359/813 |
| 7,224,828 B2 | 5/2007 | Cotton | |
| 7,492,529 B2 | 2/2009 | Pakdaman | |
| 7,639,025 B2 | 12/2009 | Hanson | |
| 7,659,981 B2 | 2/2010 | Lo | |
| 2004/0032274 A1 * | 2/2004 | Cader et al. | 324/760 |
| 2011/0069379 A1 * | 3/2011 | Becker et al. | 359/368 |
| 2011/0173728 A1 * | 7/2011 | Afshari | 850/1 |
| 2012/0170024 A1 * | 7/2012 | Azzazy et al. | 356/51 |

\* cited by examiner

*Primary Examiner* — Stephone B Allen
*Assistant Examiner* — Rahman Abdur
(74) *Attorney, Agent, or Firm* — SV Patent Sevice

(57) ABSTRACT

An optical probe system includes a sample plate for holding a target device comprising an integrated circuit, and a rotational stage that includes a plurality of ports configured to receive and hold a plurality of optical objective systems that can collect reflected or emitted light from the integrated circuit. At least one of the ports includes a centering plate mounted on the rotational stage and configured to conduct a translational movement on the rotational stage. The port also includes a gimbal plate mounted on the centering plate and that can be tilted relative to the centering plate. A first optical objective system that is mounted on the gimbal plate can be centered by the center plate and aligned by the gimbal plate.

22 Claims, 10 Drawing Sheets

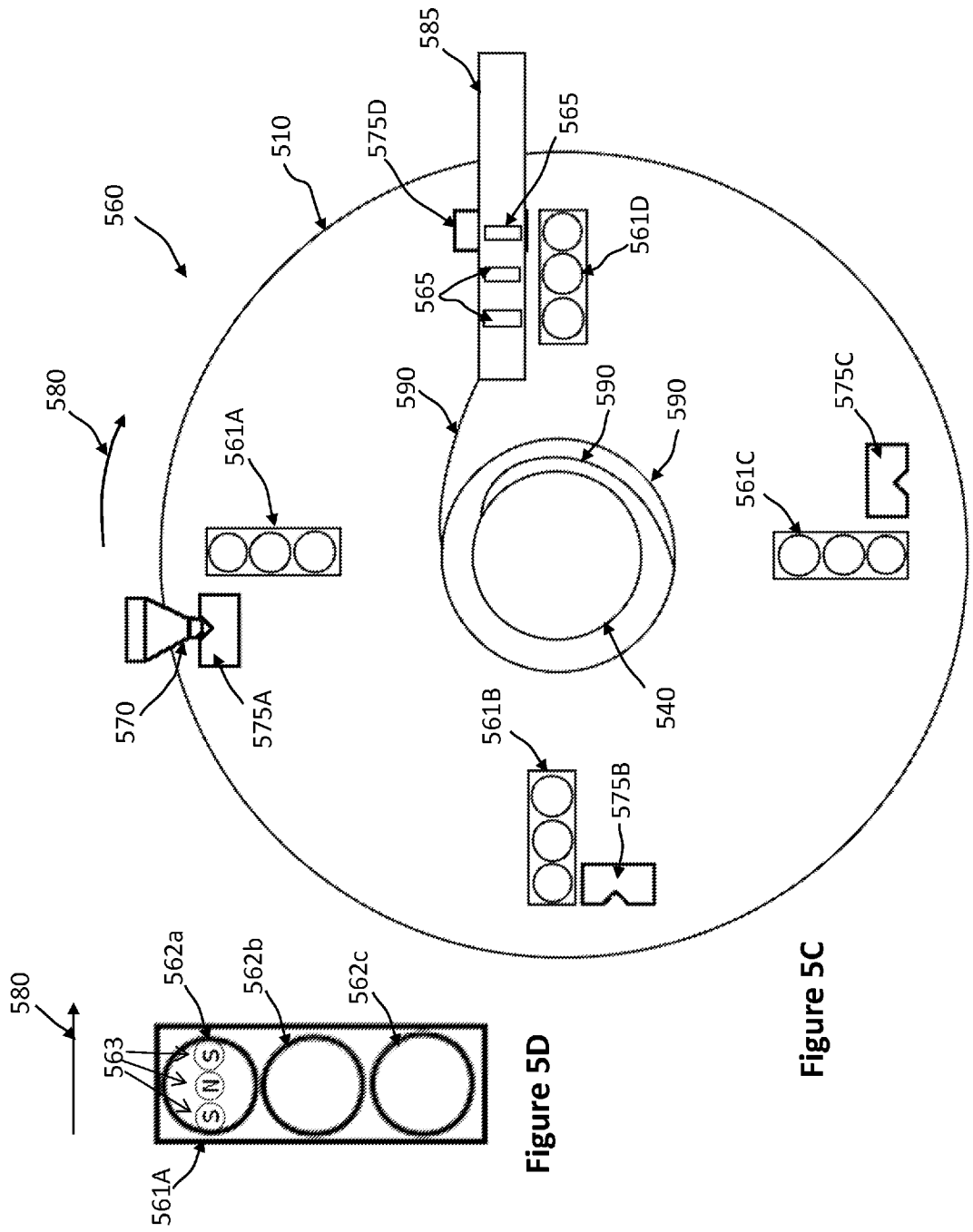

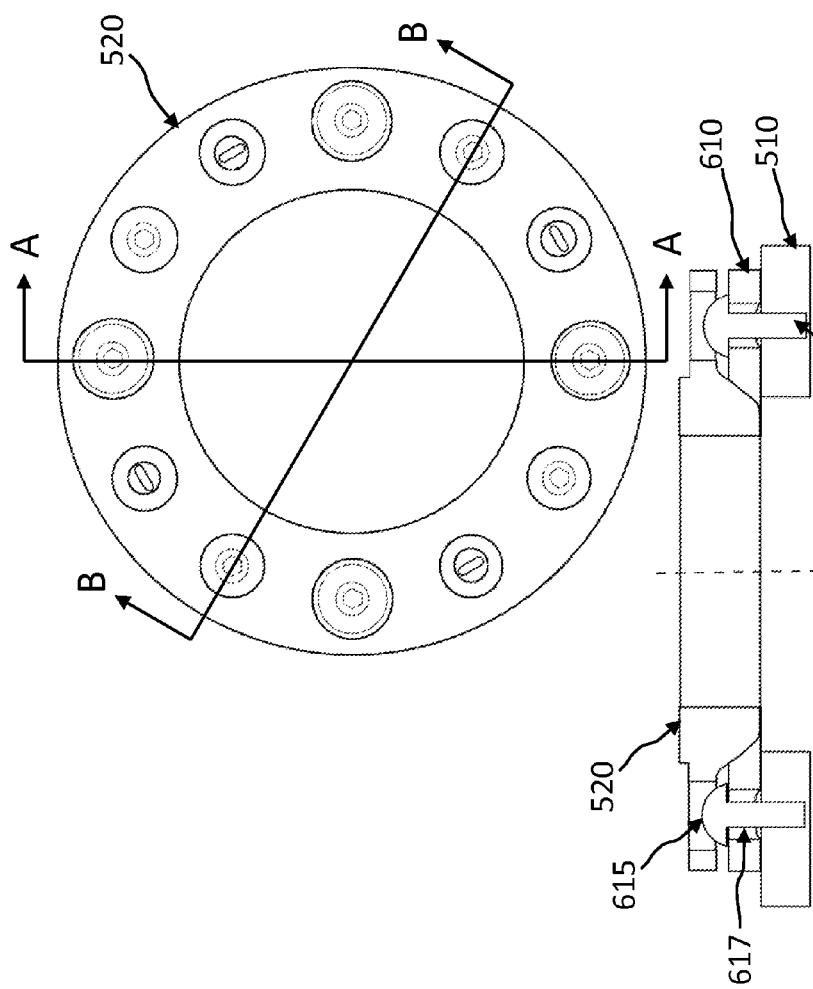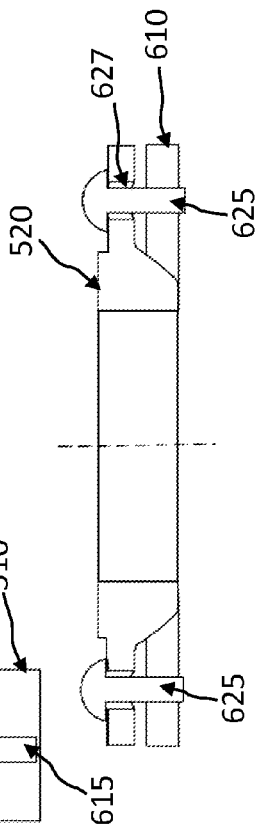

OPTICAL PROBE SYSTEM HAVING ACCURATE POSITIONAL AND ORIENTATIONAL ADJUSTMENTS FOR MULTIPLE OPTICAL OBJECTIVES

BACKGROUND OF THE INVENTION

The present application relates to systems and methods for probing features and functions of semiconductor integrated circuits (ICs).

To improve IC functionality and performance, IC manufacturers in the last four decades have been shrinking the sizes of circuit components, and at the same time, increasing the number of circuit components per IC. As electronic devices become more miniaturized and more powerful, IC devices become smaller and more devices are packed onto each chip. The cost of manufacturing has increased and the yield has decreased for these devices. New causes of yield decrease emerge as different materials are utilized and the process variation tolerances shrink.

Probe tools are frequently utilized during the testing and debugging of IC designs, where efforts are focused on defect localization and accurate waveform and timing measurements of signal switching inside silicon-based devices. Both signal measurements and optical analysis with probe tools are performed through the back side of the device. By utilizing the optics in the probe tool, electrical properties of the extremely small individual components (i.e. transistors) on the IC can be measured for proper functionality without interfering with the devices' function.

The decreasing sizes of circuit features in electronic devices create a significant challenge for probe tools. Analytical tools are required to discern increasingly smaller circuit features and to preform timing analysis on single transistor nodes. One requirement for the probing systems is to provide optical measurement at different magnifications, including high resolution measurement by high numerical aperture (N.A.) solid immersion lens (SIL). Another challenge for the probing systems is to suppress measurement errors caused by mechanical disturbances. Moreover, a significant amount of heat can be generated by operating the device at design speeds and voltages during optical measurements, and the light source from the probing tool can also generate heat when focused onto an IC device, both of which can affect the proper function of the integrated circuit. As such another challenge for probing systems is to remove the increasing amount of heat generated during the debug and test procedures.

Accordingly, there is a need for improved optical probe systems that can meet the challenges and requirements presented by the sophisticated and evolving semiconductor industry.

SUMMARY OF THE INVENTION

The present application discloses a multi-resolution microscopy system for testing and probing semiconductor integrated circuits. Optical probes at different magnifications can be easily mounted and switched, allowing measurement with high resolution through high N.A. solid immersion lenses. The presently disclosed optical probe system provides a rotational stage that can hold multiple optical objective systems at different magnifications and provides full positional and tilt adjustment capabilities to each optical objective system. A magnetic sensing system can detect the positions of the optical objective systems. The magnetic sensing system does not generate light that can affect the highly sensitive optical measurement of the optical probe. The rotational stage is further equipped with mechanism to bypass water and prevent it from damaging electronics under the rotational stage. A flexible circuit is configured to transmit electronic signals from the processors and controllers in the fixed frame to the optical objective system that can rotate on the rotational stage.

The optical measurement in the presently disclosed optical probe system is isolated from mechanical disturbances in the surrounding environment, which reduces or eliminates measurement errors caused by mechanical vibrations. The optical measurement is isolated from vibration induced by coolant being injected onto the IC under test, which reduces or eliminates measurement errors caused by the interference of the flowing coolant with the optical focus and axis. The disclosed system and method provide proper cooling to remove heat generated during the optical measurement. The disclosed system and method can also provide heating to simulate harsh operating conditions to the device under test. Thermal control fluid is sealed and kept in the temperature control chamber by a reliable vacuum seal. The vacuum seal itself is compatible with multiple objectives provided they conform to the proper geometry. The seal includes a flexible portion and allows the optical probe to be accurately positioned to different locations on the target IC. The temperature control chamber is mounted in such a manner that it allows for vibration isolation from the chamber; it allows the IC under test to be tipped and tilted with respect to the optical axis; and it allows for precise placement of the optical axis onto the IC. The temperature control chamber mount is capable of centering the chamber at a different point than the optical axis, this is controlled by the design of the chamber mount and a movement scheme implemented via the computer control.

In one general aspect, the present invention relates to an optical probe system for probing an electronic device, comprising: a sample plate that can hold a target device comprising an integrated circuit; a temperature control chamber that can hold a fluid to control the temperature of the target device; a rotational stage comprising a plurality of ports each configured to receive and hold one of a plurality of optical objective systems that include a first optical objective system, wherein the first optical objective system is mounted to one of the plurality of ports that defines a staging position, wherein the first optical objective system is configured to collect reflected or emitted light from the integrated circuit in the target device; a vertical translation stage that can move the first optical objective system in a vertical direction substantially perpendicular to the sample plate, wherein a portion of the first optical objective system is moved through the temperature control chamber to allow the first optical objective system to focus at the integrated circuit in the target device; and an x-y translation stage that can move the first optical objective system substantially in the horizontal directions.

Implementations of the system may include one or more of the following. The one of the plurality of ports in the rotational stage can include: a centering plate mounted on the rotational stage and configured to conduct a translational movement on a surface of the rotational stage; and a gimbal plate mounted on the centering plate and configured to be tilted relative to the centering plate, wherein the first optical objective system is mounted on the gimbal plate which allows the center plate to center the position of the first optical objective system in the one of the plurality of ports and allows the gimbal plate to adjust the orientation of the first optical objective system. The optical probe system can further include a positioning system configured to control the position of at least one of the plurality of ports on the rotational stage, wherein the positioning system can include one or more magnets mounted on the rotational stage in association with one of the plurality of ports; and one or more magnetic sensors that can remain stationary when the rotational stage is rotated, wherein the one or more magnetic sensors can detect the one or more magnets and to produce a sensing signal, wherein the rotational stage can stop a rotational movement when the one of the plurality of ports arrives at a predetermined position. The multiple magnets can be positioned in a linear array along direction of the rotational movement. The magnets can be mounted at different radial positions on the rotational stage in association with different ports, which allows the different ports to be uniquely identified. The positioning system can include: V-grooves each mounted on the rotational stage in association with one of the plurality of ports; and a spring-loaded detent that can remain stationary when the rotational stage is rotated, wherein the spring-loaded detent is configured to catch and be locked into one of the V-groove, which precisely registers the one of the plurality of ports arrives at the predetermined position. The rotational stage can include a gutter or a channel on an upper surface, wherein the gutter or the can guide the fluid to flow off the rotational stage. The optical probe system can further include a shaft around which the rotational stage is rotated; a fixed frame that is configured to remain stationary when the rotational stage is rotated; and a flexible circuit having one end attached to the shaft and another end connected to the fixed frame, wherein the flexible circuit is wound around the shaft with sufficient slack to allow free rotational movement of the rotation stage. The flexible circuit can transmit electronic signals to control the first optical objective system to focus at the integrated circuit in the target device. The vertical translation stage can move the rotational stage in the vertical direction. The x-y translation stage can move the rotational stage in the horizontal directions. The optical objective system can include an objective tip and a solid immersion lens near the objective tip, wherein the objective tip can be in contact with the target device. The integrated circuit can be constructed near a first surface of the target device, wherein the objective tip is in contact with the second surface of the target device that is opposing to the first surface. The optical objective system can include a window configured to be in contact with the target device. At least two of the plurality of optical objective systems can have different optical magnifications. The optical objective system can focus an incident light on the integrated circuit. The optical objective system can focus the incident light to form a focused light spot on the integrated circuit. The optical probe system can further include an optical scanning system configured to produce a relative movement between the focused light spot and the integrated circuit. The optical probe system can further include an optical detector configured to convert the reflected light collected by the optical objective system to an electric signal. The optical probe system can further include a signal generator configured to send an electrical signal to the integrated circuit in the target device to simulate operating conditions of the integrated circuit. The incident light can include a laser beam.

In another general aspect, the present invention relates to an optical probe system for probing an electronic device which includes: a sample plate that can hold a target device comprising an integrated circuit; and a rotational stage comprising a plurality of ports each configured to receive and hold one of a plurality of optical objective systems that include a first optical objective system, wherein the first optical objective system is mounted to one of the plurality of ports that defines a staging position, wherein the first optical objective system can collect reflected or emitted light from the integrated circuit in the target device, wherein the one of the plurality of ports in the rotational stage comprises: a centering plate mounted on the rotational stage and configured to conduct a translational movement on a surface of the rotational stage; and a gimbal plate mounted on the centering plate and configured to be tilted relative to the centering plate, wherein the first optical objective system is mounted on the gimbal plate which allows the center plate to center position of the first optical objective system in the one of the plurality of ports and allows the gimbal plate to adjust orientation of the first optical objective system.

In yet another general aspect, the present invention relates to an optical probe system optical probe system for probing an electronic device which includes a sample plate that can hold a target device comprising an integrated circuit; a rotational stage comprising a plurality of ports each configured to receive and hold one of a plurality of optical objective systems that include a first optical objective system, wherein the first optical objective system is mounted to one of the plurality of ports that defines a staging position, wherein the first optical objective system can collect reflected or emitted light from the integrated circuit in the target device; and a positioning system that can control positions of at least one of the plurality of ports on the rotational stage, wherein the positioning system comprises: one or more magnets mounted on the rotational stage in association with one of the plurality of ports; and one or more magnetic sensors that remain stationary when the rotational stage is rotated, wherein the one or more magnetic sensor can detect the one or more magnets and to produce a sensing signal, wherein the rotational stage can stop a rotational movement when the one of the plurality of ports arrives at a predetermined position.

These and other aspects, their implementations and other features are described in detail in the drawings, the description, and the claims.

BRIEF DESCRIPTION OF THE DRAWINGS

FIG. 5C is a bottom view of the rotational stage illustrating a positioning system for registering the optical objective systems to predetermined positions, and a flexible circuit spanning between a fixed frame and the rotational stage.

FIG. 5D shows details of a magnetic array in the positioning system in FIG. 5C.

FIG. 6A is a top view of a gimbal plate configured to mount an optical objective system in a port in the rotational stage.

FIG. 6B is a cross-sectional view of a centering mechanism for the gimbal plate along A-A in FIG. 6A.

FIG. 6C is a cross-sectional view of the leveling mechanism of the gimbal plate shown along B-B in FIG. 6A.

DETAILED DESCRIPTION OF THE INVENTION

Figure 1:
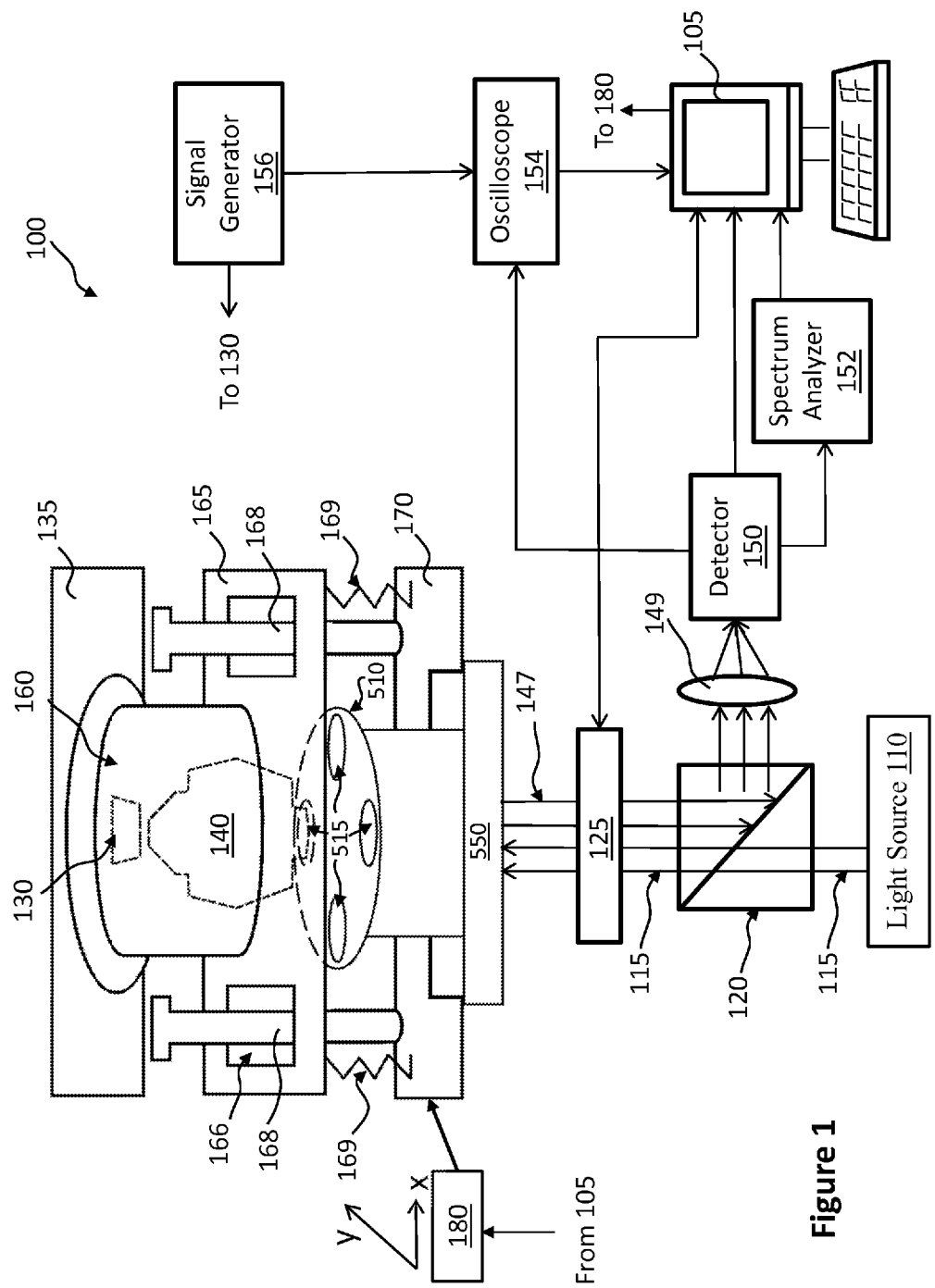
FIG. 1 is a system diagram for an optical probe system for probing an integrated circuit in accordance with the present invention.
Figure 2:
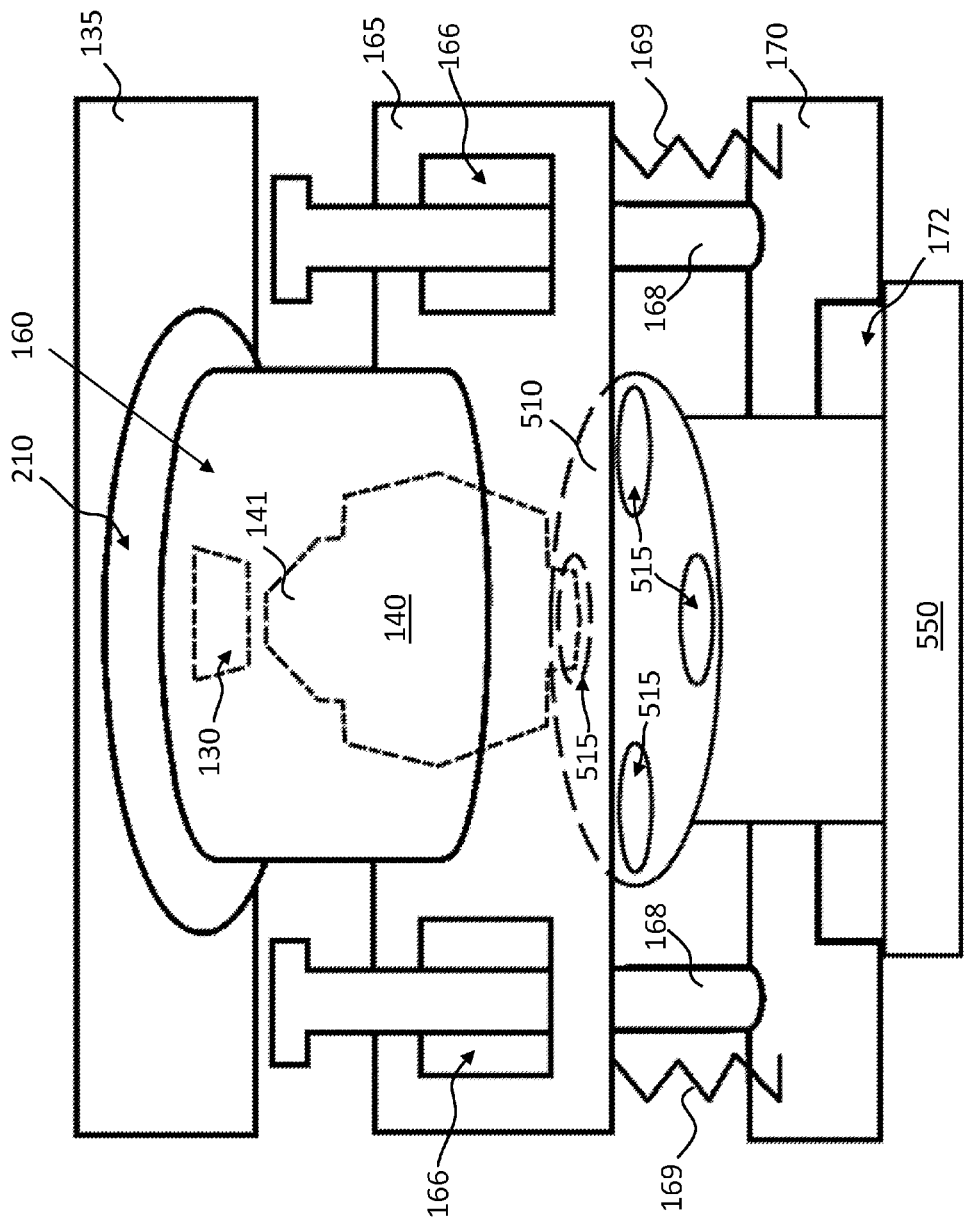
FIG. 2 is a detailed view of the optical objective system, the temperature control chamber, and associated components in the optical probe system in FIG. 1.

Referring to FIGS. 1 and 2, an optical probe system 100 includes a light source 110, a beam splitter 120, a scanning system 125, an optical objective system 140, a photo detector 150, a spectrum analyzer 152, an oscilloscope 154, a signal generator 156, and a computer 105. The light source 110 can be implemented by a laser emitting device (such as tunable or continuous wave (CW) laser source or other light sources such as a pulsed or mode-locked laser), or a non-coherent light source. Incident light 115 emitted by the light source 110 passes the beam splitter 120. The photo detector 150 can be implemented by an avalanche photo detector. The scanning system 125 can be implemented by moveable galvo mirrors which can also include Acoustic-Optics Device, deflector scanning lens, and tube lens etc. As described in more detail below, the optical objective system 140 is mounted in one of several ports 515 in a rotational stage 510. The rotational stage 510 can hold, in the several ports 515, a plurality of optical objective systems having different magnifications.

The incident light 115 is directed to the optical objective system 140. The optical objective system 140 can include an assembly of lenses (not shown). In some embodiments, the optical objective system 140 can include an objective tip 141 (FIG. 2) that is placed in contact against a first (e.g. lower) planar surface of a target device 130. The objective tip 141 is usually part of a solid immersion lens having optical magnification power, which, together with the assembly of lenses, allows the objective system 140 to provide high optical magnification. In some embodiments, the optical objective system 140 can include a window without measureable magnification (i.e. magnification power of x~1) to provide low optical magnification in the objective system 140. The window is usually flat, or can sometimes have a small convex curvature to improve contact with the target device 130. The window and the objective tip 141 are respectively sealed to prevent the temperature-control fluid (described below) from getting into the objective system 140. The target device 130 includes an integrated circuit (not shown) that is constructed on or near a second planar surface (e.g. the upper side) opposing to the first planar surface of the target device 130. The target device 130 is mounted on a sample plate 135.

The optical objective system 140 can include a family of lenses (not shown) and the objective tip 141 configured to focus the incident light 115 on the integrated circuit. The optical objective system 140 has a high magnification and a high numerical aperture (N.A.) with a high-refractive-index solid material, which produces a laser spot at the IC. The optical objective system 140 combines the advantages of conventional microscopy with those of near-field techniques. The high N.A. optical objective system 140 can form a tightly focused laser spot on the substrate of the integrated circuit as well as collect light; thus significantly improving collection efficiency.

The reflected light 147 (reflected or scattered) from the integrated circuit is collected by the optical objective system 140, directed by the beam splitter 120, and focused by a lens 149 to the photo detector 150 which converts photons to an electric signal, from which an image of the integrated circuit is formed.

The optical probe system 100 can acquire images of the integrated circuit by scanning a focused laser spot formed by an incident laser beam. The laser spot, having a width only a fraction of the dimension of the integrated circuit, is scanned across the x and y directions of the integrated circuit by the scanning system 125 which comprise moveable mirrors that can steer a laser beam in two dimensions. The light reflected from different locations of the integrated circuit forms an image element in the photo detector 150. The detected light signals from different locations of the integrated circuit respectively represent image elements, which are combined by the computer 105 to form a laser scanning image of the integrated circuit.

In some embodiments, the light source 110 can be implemented by a continuous-wave laser. The signal generator 156 generates and inputs an oscillating signal into the integrated circuit at a modulation frequency to simulate operating conditions of the integrated circuit during optical probing. The modulation frequency is typically in the radio frequency range. The spectrum analyzer 152 receives at least a portion of the detected signal from the photo detector 150 and locks the signal at a data frequency which is the same or at half value of the modulation frequency. The output of the spectrum analyzer 152 varies as the focused laser spot moves to different locations of the integrated circuit. The scanner 125 can also be fixed at a location on the integrated circuit that produces high signal intensity. The signals from the photo detector 150 can be directed to the oscilloscope 154 to produce waveforms.

During measurement, as discussed above, a portion of the optical energy of the incident light 115 is absorbed by the target device 130 and other components in the optical probe system 100, which can generate a significant amount of heat. Additionally, the target device 130 can also generate heat as electronic signals are applied to it during measurement. Since an integrated circuit cannot properly function and can sometimes be damaged at elevated temperatures caused by the heat, the target device 130 must be properly cooled in operation. It should be noted that in some applications, the target device 130 and its surroundings may also need to be heated to simulate certain operating conditions.

It should be noted that the disclosed system is compatible with other electro-optical methods for debugging and testing integrated circuits. For example, the probe method can include photo emission microscopy in which electronic signals are applied to the integrated circuit in the target device to simulate operation conditions. Light emissions generated by the integrated circuit is collected and analyzed, without incident light illuminating the target device.

Figure 3:
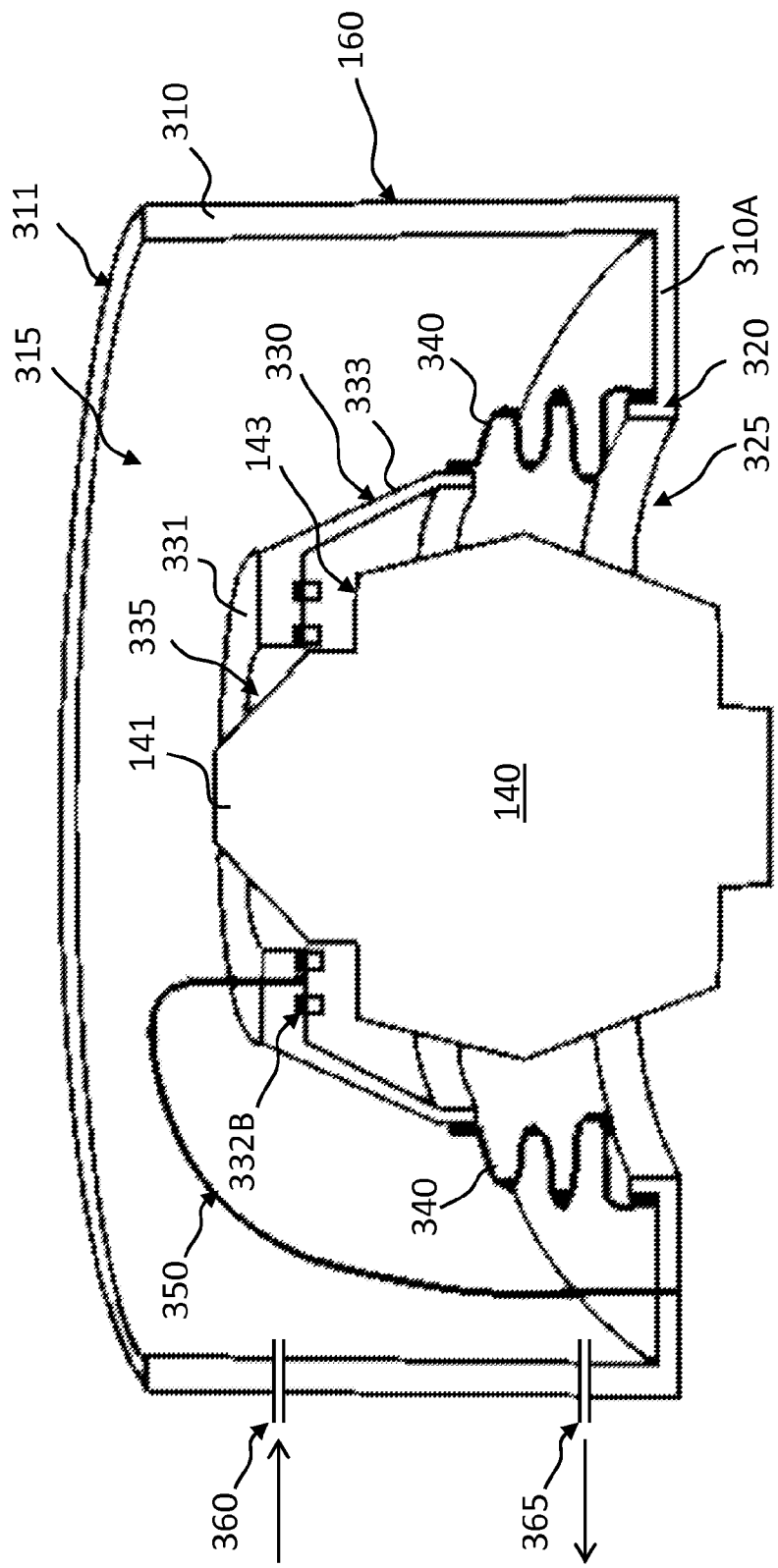
FIG. 3 illustrates the sealing between the optical objective system and the temperature control chamber in FIGS. 1 and 2.

Still referring to FIGS. 2-3, a temperature control chamber 160 is mounted on a base plate 165. The base plate 165 has through-holes 166 and is held by pins 168 which are fixed onto a work stage 170. The through-holes 166 have openings slightly larger than the widths of the pins 168, which leaves gaps between the base plate 165 and the pins 168 in the horizontal directions. These gaps provide clearance between the temperature control chamber 160 and the work stage 170 in the x and y directions. Compression springs 169 fixed to the work stage 170 are compressed between the base plate 165 and the work stage 170. A space between the pins 168 and the sample plate 135 allows the range of movement for the base plate 165 and the temperature control chamber 160. A ring-shaped clamp plate 210 is fixedly held (e.g. bolted or gasketed) to the sample plate 135 to form a watertight seal with a gasket around the device 130. The clamp plate 210 can for example be made of stainless steel that is bolted to the sample plate 135. The temperature control chamber 160 includes an upper opening 315 which is configured to form a seal against the clamp plate 210 when the temperature control chamber 160 is held against the clamp plate 210 by spring force of the compression springs 169, which encloses the target device 130. The rim of the upper opening 315 can be coated with Teflon™ material to facilitate the seal and to allow the temperature control chamber 160 to slide across the clamp plate 210.

It should be noted that the positions of the through holes 166 and the pins 168 can be switched to achieve similar functions. In other words, the through holes can be formed in the work stage, and the pins are fixed to the base plate while the pins are positioned through the through holes.

During measurement, a fluid is flowing through the temperature control chamber 160 to remove or add heat from the system in order to keep the target device 130 at a certain temperature range. The fluid can be a gas or a liquid such as water, liquid nitrogen, etc. In the disclosure below, coolant (cooling rather than heating) is used as an example to describe the fluid for maintaining the temperature of the target device 130.

Figure 5:
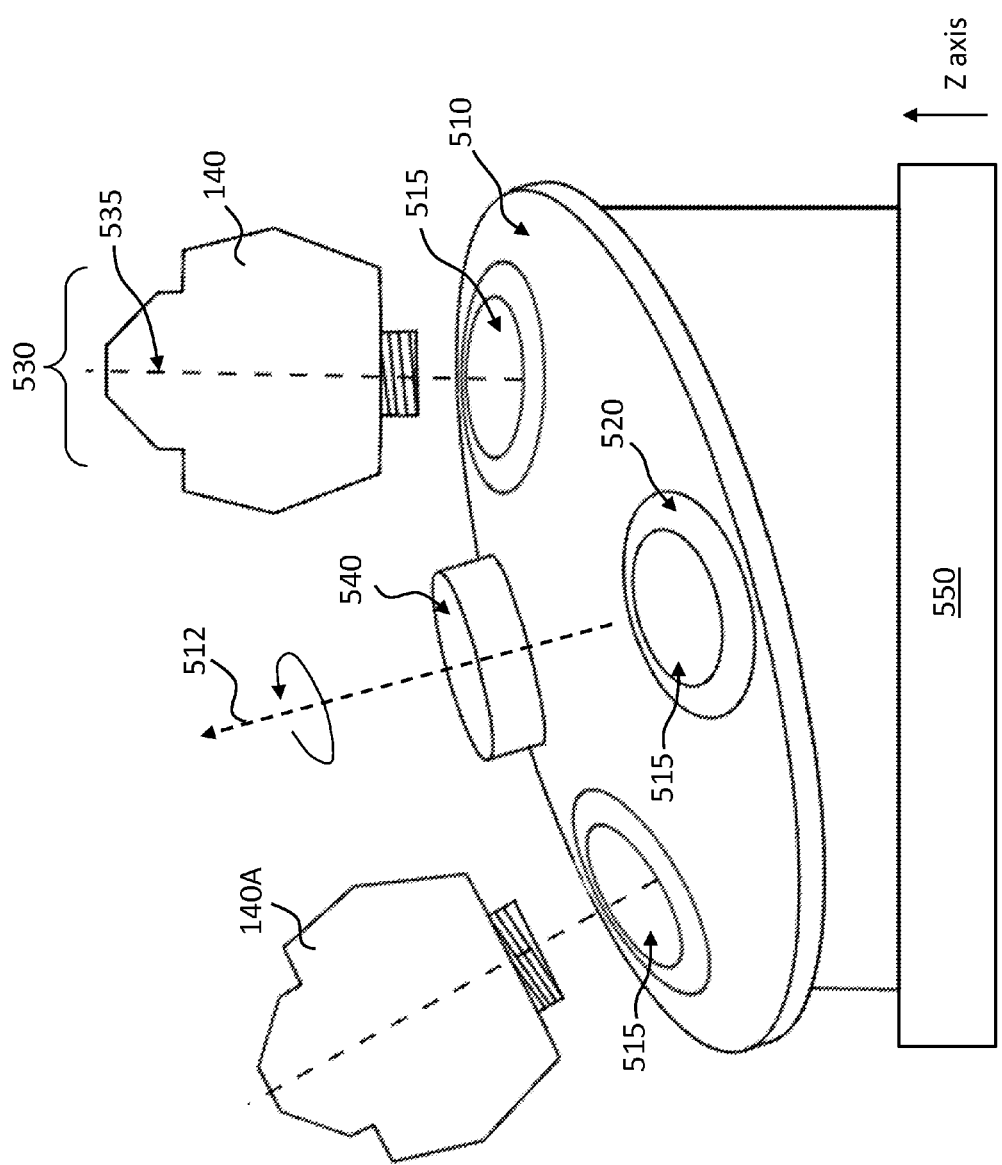
FIG. 5 illustrates a rotational stage configured to hold multiple optical objective systems having different optical magnifications.

Referring FIGS. 2, 3, and 5, the optical objective system 140 is mounted on a rotational stage 510 (as shown in FIG. 5 and described below) that can be moved vertically through an opening 172 in the work stage 170. During set-up for measurement, the optical objective system 140 and the rotational stage 510 together are pushed upward by a vertical translation stage 550 towards the target device 130. This is to allow the optical objective system 140 to be in focus on the integrated circuit in the target device 130. The vertical translation stage 550 is fastened to the work stage 170. The work stage 170 is mounted on an x-y translation stage 180 as shown in FIG. 1. Under the control of the computer 105 (FIG. 1), the combination of the vertical translation stage 550 and the x-y translation stage 180 can move the optical objective system 140 in x, y, z directions, relative to the target device 130 on the sample plate 135.

Figure 4:
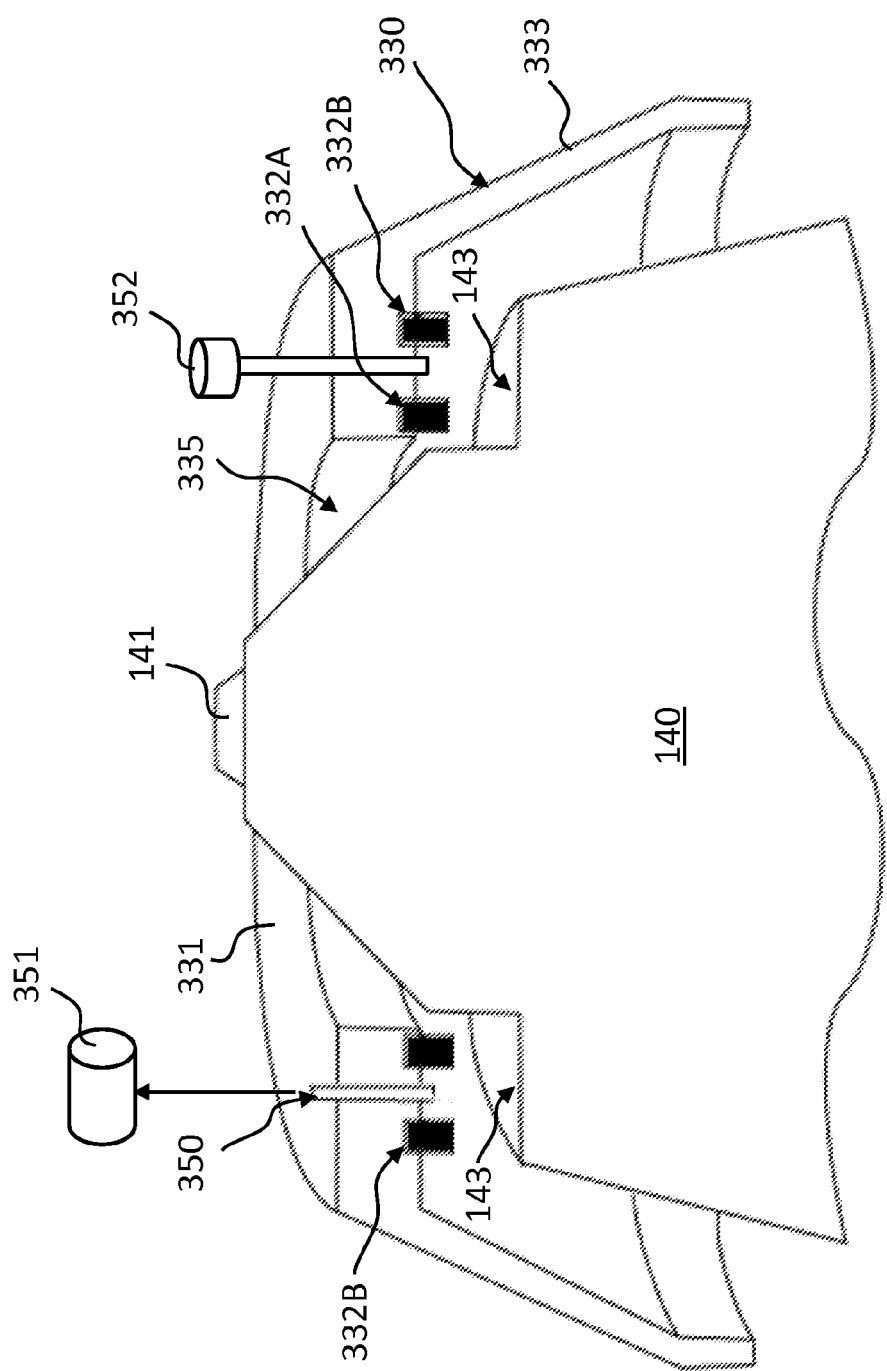
FIG. 4 is a detailed view of the sealing between the optical objective system and a seal head in the temperature control chamber.

Referring FIGS. 3 and 4, the temperature control chamber 160 includes an outer chamber wall 310 which includes the upper opening 315 defined by upper rim 311, which allows movement of the optical objective system 140 for probing of the target device 130 (FIGS. 1 and 2). The outer chamber wall 310 can include a lower portion 310A, a seal head 330, and a flexible bellows 340. The lower portion 310A includes a lower rim 320 defining a lower opening 325. It should be noted that the temperature control chamber 160 can be formed by a unitary component or by several components (by welding, bonding, bolting, etc.) The seal head 330 includes a top plate 331, a side wall 333, and an inner opening 335 formed in the top plate 331. The bellows 340 is connected to the outer edge of the seal head 330 and the lower rim 320 in the lower portion 310A, which forms an enclosure for the coolant in the temperature control chamber 160. The temperature control chamber 160 can include a fluid supply 360 and an outlet 365 respectively for receiving and disposing the liquid coolant. In one implementation, the fluid supply 360 is configured to direct the liquid coolant at the target device 130. There is a mechanism (not shown in FIG. 3) which holds the seal head 330 in place at the center of opening 325 and at a certain height when the objective system 140 is not in place.

During set-up, the optical objective system 140 is pushed up through the lower opening 325 in the lower portion 310A of the outer chamber wall 310, which allows the objective tip 141 to reach through the opening 335 to come in contact with the target device 130 (not shown). The lower surface of the top plate 331 is mounted with a pair of elastic members 332A, 332B each of which forms a closed loop around the opening 335. The pair of elastic members 332A, 332B are nested in each other (e.g. concentric relative to each other) and spaced by a gap there between. The elastic members 332A, 332B can be in different cross-sectional shapes such as square, round, trapezoidal, or rectangular (i.e. flat against the sealing surface), etc. In one implementation, the elastic members 332A, 332B can be O-rings. A vacuum line 350 is in fluidic connection to the space between the pair of elastic members 332A, 332B. The optical objective system 140 includes a circle of a flat surface 143 around the objective tip 141. When the optical objective system 140 is pushed up, the flat surface 143 is pressed against the pair of elastic members 332A, 332B. The space between the pair of elastic members 332A, 332B is exhausted by a vacuum pump 351 via the vacuum line 350 to form a vacuum in the space between the pair of elastic members 332A and 332B. The level of the vacuum can be measured by an air pressure sensor 352 to determine whether or not a seal has been appropriately formed. If the air pressure in the space drops to below a predetermined level, it can be determined that a vacuum seal has been properly made and it is appropriate for the coolant to be placed in the temperature control chamber 160. After a measurement, the coolant is exhausted from the temperature control chamber 160. The vacuum between the pair of elastic members 332A, 332B is released through the vacuum line 350. The optical objective system 140 is moved downward to be disengaged from the temperature control chamber 160.

Figure 5A:
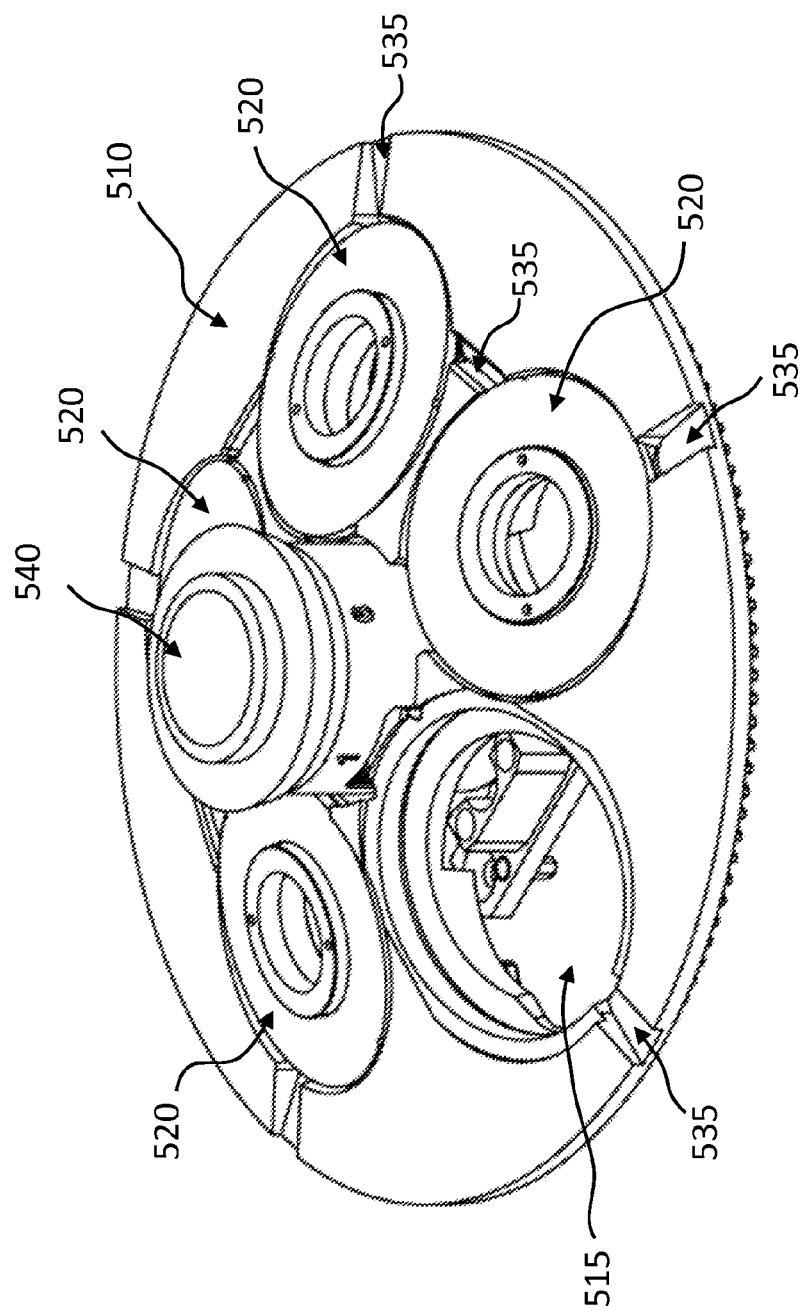
FIG. 5A illustrates a top perspective view of the rotational stage.
Figure 5B:
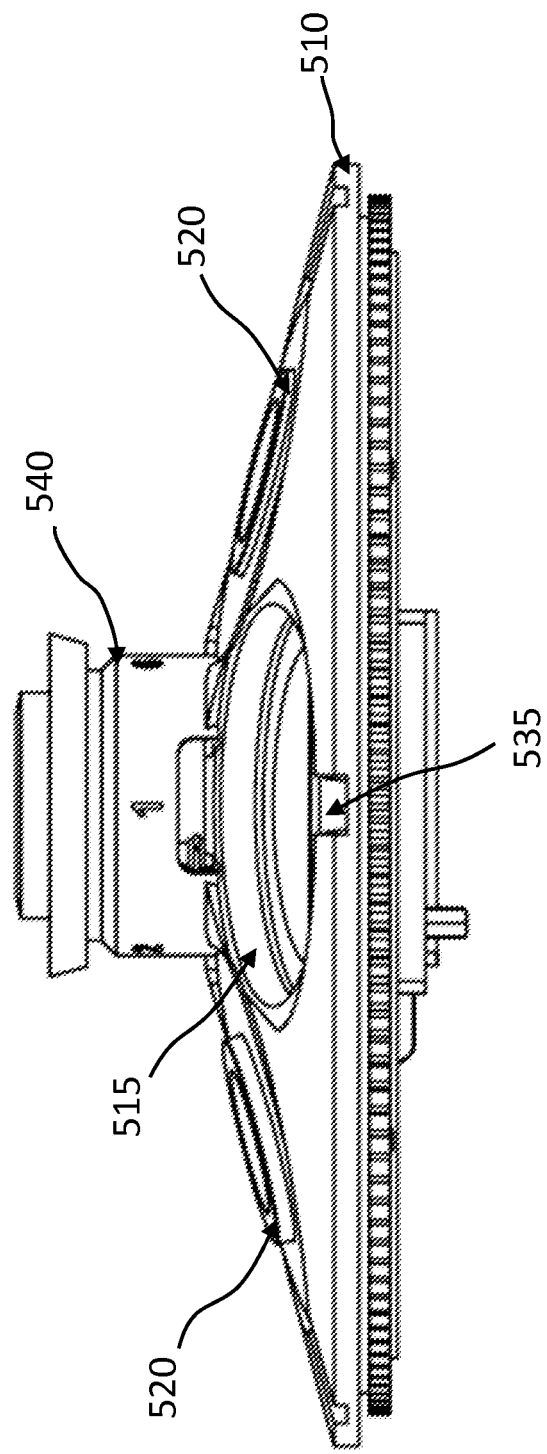
FIG. 5B is a side view of the rotational stage.

In some embodiments, the optical probe system 100, referring to FIGS. 5, 5A, 5B, includes the rotational stage 510 that can rotate around a shaft 540. The rotational stage 510 includes a plurality of ports 515 each of which can include a gimbal plate 520 configured to hold and adjust orientation of one of the optical objective systems 140, 140A. The rotational stage 510 is configured to rotate around an axis 512 defined by the shaft 540 to move the optical objective system 140 to a staging position 530 aligned under the opening 172 in the work stage 170 (FIG. 2). As described above, the vertical translation stage 550 is configured to move the rotational stage 510 along the vertical direction (i.e. the z axis), which can push the optical objective system 140 at the staging position 530 through the opening 172 in the work stage 170 (FIG. 2), and the lower opening 325 and the inner opening 335 in the seal head 330 (FIG. 3) toward the target device 130 to a position. The vacuum sealing is formed as described above, which readies the system for measurement.

In optical probe operation, small amount of coolant can sometimes be leaked through the sealing between the flat surface 143 and the elastic members 332A, 332B (FIG. 3). Moistures in the system can also be condensed on surfaces of the optical objective system 140. In some embodiments, referring to FIGS. 5A and 5B, the rotational stage 510 includes channels and gutters 535 on its upper surface for guiding the water and/or coolant to allow them to drain off the rotational stage 510, which prevents the water and liquid to damage mechanisms and electronic circuit and components in the shaft 540 and under the rotational stage 510.

The optical objective systems 140, 140A are rotated by a motor and gear assembly (not shown) in a circular direction 580 around the shaft 540 to appropriate positions to place one of the optical objective systems 140, 140A at the staging position 530. The position of each of the optical objective systems 140, 140A are tracked and registered by a positioning system 560 shown in FIGS. 5C and 5D. The positioning system 560 includes magnetic arrays 561A-561D. Each magnetic array 561A-561D, as shown in FIG. 5D, can include one or more slots 562a, 562b, 562c at different radial positions on the rotational stage 510. Each slot 562a, 562b, or 562c can hold a magnetic array that includes multiple alternating magnets 563. For example, three magnets 563 in the slot 562a are respectively aligned in N/S/N or S/N/S directions. The magnets 563 are positioned in a linear array along the direction 580.

Different ports 515 on the rotational stage 510 are uniquely coded by the location of the magnetic arrays in their respective slots, or absence of any magnetic array in any slots. For example, the magnetic array 561A may only have its outer slot occupied by a magnetic array; the magnetic array 561B may only have its middle slot occupied by a magnetic array; the magnetic array 561C may only have its inner slot occupied by a magnetic array; the magnetic array 561D have include two magnetic arrays in two of its associated slots. Each magnetic array can have one or more slots respectively occupied by magnetic arrays. The unique patterns of the magnetic arrays that correspond to different ports 515 allow the identity of the port 515 that is moved into position to be uniquely determined. The positioning system 560 includes magnetic sensors 565 which are mounted on a fixed frame 585 that is fixed relative to the vertical translation stage 550. The magnetic sensors 565 do not rotate with the rotational stage 510. Examples of the types of sensors suitable for the magnetic sensors include a Hall-effect sensor. When different ports 515 that are respectively mounted with different optical objective systems 140, 140A are rotated along the direction 580, the magnets 563 in one or more slots 562a-562c are detected by the magnetic sensors 565. In response to a detection signal from the magnetic sensor 565, the rotation is stopped by the motor (not shown) at the desired position.

In some embodiments, the positioning system 560 includes a spring-loaded detent 570 fixed relative to the vertical translation stage 550 and V-grooves 575A-575D mounted on the rotational stage 510 in association with different ports 515. When the rotational movement is stopped, the rotational stage 510 "rocks" back and forth to allow the spring-loaded detent 570 to catch and be locked into one of the V-grooves 575A-575D, which precisely registers the corresponding port 515 and the associated optical objective system in the staging position 530.

One advantage of the above described positioning system is that it does not use light (e.g. emitted by a light emitting diode) for position sensing as in most position detection systems, which prevents stray light from an optical-based position detection from interfering with the optical probe tools' functions.

In some embodiments, a flexible circuit 590 connects to the frame 585 at one end and to the shaft 540 in the rotational stage 510 at the other. The flexible circuit 590 may be implemented by a printed circuit ribbon, which is configured to transmit control and sensing signals between the optical objective systems 140 and a central controller or processor (not shown) that is stationary relative to the rotational movements of the rotational stage 510. Examples of signals include control, sensing, and power signals for driving a motor to focus the optical objective system 140 at the target device 130 (FIG. 1). The flexible circuit 590 is configured long enough to wrap several rounds around the shaft 540. When the rotational stage 510 rotates in the direction 580, the winding of the flexible circuit 590 is tightened. The slack in the extra length in the flexible circuit 590 is sufficient to allow free rotational movement of the rotational stage 510 to move all the relevant ports 515 to the staging position 530. After each rotational movement, the rotational stage 510 can reverse the direction of rotation, which keeps enough slack always present in the flexible circuit 590 around the shaft 540.

An advantage of the above described configuration for the flexible circuit is that it allows electronic signals to be effectively transmitted from a stationary part to a moving part. Furthermore, the signal transmission is implemented without using an optical signal, which is not suitable for an optical probe system as described herein. Moreover, the flexible circuit and its connectors can be water sealed, which in conjunction with the water gutter and channel system (535 in FIGS. 5A and 5B) allows safe and reliable electronic signal transmission in a moist or wet environment.

Still referring to FIGS. 5, 5A, and 5B, to ensure proper probing operation, the optical objective system 140 at the staging position 530 must be properly leveled and centered relative to the optical axis that is perpendicular to the target device 130 (FIGS. 1 and 2). The proper leveling and centering of the optical objective system 140 at the staging position 530 also ensure that optical objective systems 140 at different magnifications are aligned consistently relative to the target device 130 when each of them is respectively staged in operation (i.e. to achieve a very high level of optical parcentration between optical objective systems). The proper leveling and centering of the optical objective system 140 at the staging position 530 is also critical because the optical objective system 140 needs to be centered for proper sealing with the seal head 330 in the temperature control chamber 160 (FIG. 3). The proper leveling and centering of the optical objective system 140 at the staging position 530 is critical to prevent air bubbles between the objective tip 141 and the target device 130 (FIGS. 2 and 3).

In some embodiments, the optical probe system provides flexible positional and orientation adjustments to each optical objective system mounted on the rotational stage 510, which is critical especially for objectives having high magnifications. Referring to FIG. 6A-6C, the gimbal plate 520 is mounted on the rotational stage 510 with a centering plate 610 in between. The centering plate 610 is mounted by a set of screws 615 onto the rotational stage 510 through holes 617 in the centering plate 610. The screws 615 can be loosened to allow the centering plate 610 to be moved in a translational movement relative to the rotational stage 510, which positions the gimbal plate 520 and the optical objective system 140 in the center of the staging position 530 (FIG. 5). The screws 625 can be adjusted to allow the gimbal plate 520 to be tilted relative to the centering plate 610, which aligns the gimbal plate 520 and the optical objective system 140 along an optical axis 535 associated with the staging position 530 (FIG. 5).

Referring to FIGS. 1-4, the flexible bellows 340 can mechanically isolate the seal head 330 from the outer chamber wall 310 in the temperature control chamber 160, which also serves to mechanically decouple the optical objective system 140 from the outer chamber wall 310. During measurement, the fluid pumped into the temperature control chamber 160 and other environmental factors can create disturbances and induce vibrations in the temperature control chamber 160. The use of the flexible bellows 340 can significantly reduce the measurement errors resulting from these mechanical disturbances.

The flexible bellows 340 also allows small movements of the objective system 140 relative to the base plate 165 as permitted by the through-holes 166 without moving the temperature control chamber 160. This ability to move the objective system 140 in small increments without disturbing the temperature control chamber 160 greatly increases positioning accuracy while staying within the gaps provided by the through-holes 166.

In some cases, an optical objective system 140 has a high optical magnification and can only detect a portion of an integrated circuit in the target device 130. The optical objective system 140 and the temperature control chamber 160 need to navigate to different portions of the integrated circuit for measurement of the whole IC. Such relative movements in the horizontal directions can be achieved by the x-y translation stage 180 that drives the work stage 170 and the vertical translation stage 550 that is fixed to the work stage 170. Under the control of the computer 105 (FIG. 1), the x-y translation stage 180 can move the work stage 170, the vertical translation stage 550, the rotational stage 510, and the optical objective system 140 relative to the target device 130 on the sample plate 135 (FIG. 1). Specifically, the upper rim 311 of the outer chamber wall 310 of the temperature control chamber 160 can be slid relative to the clamp plate 210 to facilitate such relative movements. The seal to the liquid can be maintained during the relative movement.

Figure 7:
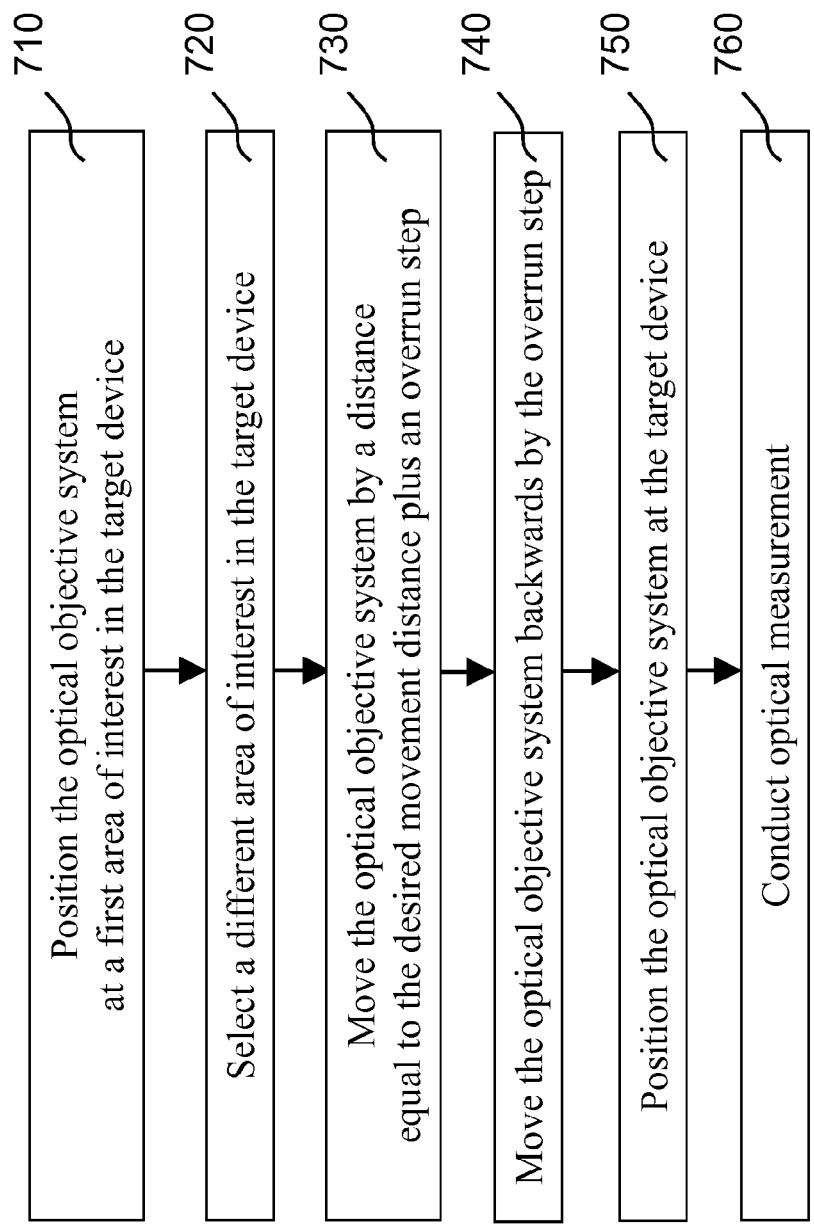
FIG. 7 is a flow chart for the process of moving the optical objective system from one location to a different area of interest on the target device when it is equipped with the cooling chamber and seal.

In some embodiments, referring to FIG. 7, the optical objective system 140 is positioned at a first area of interest of the target device (i.e. the integrated circuit) (step 710). The optical objective system 140 may or may not be engaged with the temperature control chamber 160. The optical objective system 140 can be focusing at the area of interest of the integrated circuit. A different area of interest in the target device is selected automatically or by a user (step 720). The computer 105 (FIG. 1) receives the new location. Under the control of the computer 105 (FIG. 1), the base plate 165 is moved by the x-y translation stage 180 in a horizontal direction by a distance equal to the desired movement distance plus an overrun step (step 730). The movement of the back plate 165 also moves the vertical translation stage 550, the rotational stage 510, and the optical objective system 140 relative to the target device on the sample plate 135. As discussed above, the through-holes 166 have openings slightly larger than the widths of the pins 168 (FIGS. 1 and 2), which creates gaps between the base plate 165 and the pins 168, or between the temperature control chamber 160 and the work stage 170 in the horizontal directions. After the x-y translation stage 180 moves the work stage 170 and the pins 168 to push one side of the through-holes 166 toward a horizontal direction, the pins 168 are off centered in the through-holes 166, and the optical objective system 140 also off centered relative to the target area of interest entered on the target device 130 by about half the total gap size. Thus the overrun step is about half the total slop between the temperature control chamber 160 and the work stage 170 in the horizontal directions. The overrun step for example can be approximately 250 microns in each of the x and y direction.

The work stage 170 and the pins 168 are moved backwards by the overrun step under the control of the computer 105 (FIG. 1) (step 740). The optical objective system is positioned at the new area of interest in the target device 130 (step 750). If needed, the optical objective system can be brought to focus on the target device and to be engaged (to form seal) with the temperature control chamber 160 to allow temperature control with a fluid. Optical probe measurement is conducted in the new area of the target device 130 (step 760). Steps 720-760 can be repeated to allow the system to conduct measurements across the target device 130.

It should be noted that the optical objective system can be moved relative to the target device and this movement is independent of whether or not seals are present between the temperature control chamber and the clamp plate or between the optical objective system and the seal head. In other words, the optical objective system can be positioned relative to the target device while the vacuum seal is engaged inside the temperature control chamber and while the control chamber is in contact with the clamp plate.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination.

Only a few examples and implementations are described. Other implementations, variations, modifications and enhancements to the described examples and implementations may be made without deviating from the spirit of the present invention. For example, the presently disclosed system and methods are not limited to the geometries, the shapes, and relative sizes of the temperature control chamber, the translation stages, the seal head, the base plate, and sample plate, the work stage, and so on. The presently disclosed system and methods are compatible with other types of liquid than the described examples for temperature control.

It should also be noted that the optical probing and optical objective system can include different optical components, light sources, or analysis tools from the example described above. The disclosed system is compatible with other electro-optical methods for debugging and testing integrated circuits. For example, the probe method can include photo emission microscopy in which electronic signals are applied to the integrated circuit in the target device to simulate operation conditions. Light emissions generated by the integrated circuit is collected and analyzed, without incident light illuminating the target device.

Moreover, the scanning system can be implemented in different configurations to produce relative movements between the focused laser spot and the integrated circuit. For example, instead of directing the movement of the laser spot, the laser spot can be fixed and the scanning system can move the target device and thus the integrated circuit along x and the y directions.

What is claimed is:

1. An optical probe system for probing an electronic device, comprising:
   a sample plate configured to hold a target device comprising an integrated circuit;
   a rotational stage comprising a plurality of ports each configured to receive and hold one of a plurality of optical objective systems that include a first optical objective system, wherein the first optical objective system is mounted to one of the plurality of ports that defines a staging position, wherein the first optical objective system is configured to collect reflected or emitted light from the integrated circuit in the target device, wherein the one of the plurality of ports in the rotational stage comprises:
      a centering plate mounted on the rotational stage and configured to conduct a translational movement on a surface of the rotational stage; and
      a gimbal plate mounted on the centering plate and configured to be tilted relative to the centering plate, wherein the first optical objective system is mounted on the gimbal plate which allows the center plate to a center position of the first optical objective system in the one of the plurality of ports and allows the gimbal plate to adjust orientation of the first optical objective system;
a shaft around which the rotational stage is rotated;
a fixed frame that is configured to remain stationary when the rotational stage is rotated; and
a flexible circuit having one end attached to the shaft and another end connected to the fixed frame, wherein the flexible circuit is wound around the shaft with sufficient slack to allow free rotational movement of the rotation stage.

2. The optical probe system of claim 1, further comprising:
a positioning system configured to control positions of at least one of the plurality of ports on the rotational stage, wherein the positioning system comprises:
one or more magnets mounted on the rotational stage in association with one of the plurality of ports; and
one or more magnetic sensors configured to remain stationary when the rotational stage is rotated, wherein the one or more magnetic sensors are configured to detect the one or more magnets and to produce a sensing signal, wherein the rotational stage is configured to stop a rotational movement when the one of the plurality of ports arrives at a predetermined position.

3. The optical probe system of claim 2, wherein the one or more magnets mounted on the rotational stage in association with one of the plurality of ports comprise multiple magnets, wherein the multiple magnets are positioned in a linear array along direction of the rotational movement.

4. The optical probe system of claim 2, wherein the one or more magnets are mounted at different radial positions on the rotational stage in association with different ports in the plurality of ports, which allows the different ports to be uniquely identified.

5. The optical probe system of claim 2, wherein the positioning system comprises:
V-grooves each mounted on the rotational stage in association with one of the plurality of ports; and
a spring-loaded detent that is configured to remain stationary when the rotational stage is rotated, wherein the spring-loaded detent is configured to catch and be locked into one of the V-grooves, which precisely registers the one of the plurality of ports arrives at the predetermined position.

6. The optical probe system of claim 1, further comprising:
a temperature control chamber configured to hold a fluid to control the temperature of the target device.

7. The optical probe system of claim 6, wherein the rotational stage comprise a gutter or a channel on an upper surface, wherein the gutter or the channel is configured to guide the fluid to flow off the rotational stage.

8. The optical probe system of claim 1, wherein the flexible circuit is configured to transmit electronic signals to control the first optical objective system to focus at the integrated circuit in the target device.

9. The optical probe system of claim 1, further comprising:
a vertical translation stage configured to move the first optical objective system in a vertical direction substantially perpendicular to the sample plate, which allows the first optical objective system to focus at the integrated circuit in the target device.

10. The optical probe system of claim 1, further comprising:
an x-y translation stage configured to move the first optical objective system in horizontal directions substantially parallel to the sample plate.

11. The optical probe system of claim 1, wherein at least two of the plurality of optical objective systems have different optical magnifications.

12. An optical probe system for probing an electronic device, comprising:
a sample plate configured to hold a target device comprising an integrated circuit;
a rotational stage comprising a plurality of ports each configured to receive and hold one of a plurality of optical objective systems that include a first optical objective system, wherein the first optical objective system is mounted to one of the plurality of ports that defines a staging position, wherein the first optical objective system is configured to collect reflected or emitted light from the integrated circuit in the target device; and
a positioning system configured to control positions of at least one of the plurality of ports on the rotational stage, wherein the positioning system comprises:
one or more magnets mounted at different radial positions on the rotational stage in association with one of the plurality of ports, which allows different ports to be uniquely identified; and
magnetic sensor configured to remain stationary when the rotational stage is rotated, wherein the one or more magnetic sensors are configured to detect the one or more magnets and to produce a sensing signal, wherein the rotational stage is configured to stop a rotational movement when the one of the plurality of ports arrives at a predetermined position.

13. The optical probe system of claim 12, wherein the one or more magnets mounted on the rotational stage in association with one of the plurality of ports comprise multiple magnets, wherein the multiple magnets are positioned in a linear array along direction of the rotational movement.

14. The optical probe system of claim 12, wherein the positioning system comprises:
V-grooves each mounted on the rotational stage in association with one of the plurality of ports; and
a spring-loaded detent that is configured to remain stationary when the rotational stage is rotated, wherein the spring-loaded detent is configured to catch and be locked into one of the V-grooves, which precisely registers the one of the plurality of ports arrives at the predetermined position.

15. The optical probe system of claim 12, wherein the one of the plurality of ports in the rotational stage comprises:
a centering plate mounted on the rotational stage and configured to conduct a translational movement on a surface of the rotational stage; and
a gimbal plate mounted on the centering plate and configured to be tilted relative to the centering plate, wherein the first optical objective system is mounted on the gimbal plate which allows the center plate to center position of the first optical objective system in the one of the plurality of ports and allows the gimbal plate to adjust orientation of the first optical objective system.

16. The optical probe system of claim 12, further comprising:
a temperature control chamber configured to hold a fluid to control the temperature of the target device.

17. The optical probe system of claim 16, wherein the rotational stage comprise a gutter or a channel on an upper surface, wherein the gutter or the channel is configured to guide the fluid to flow off the rotational stage.

18. The optical probe system of claim 12, further comprising:
- a shaft around which the rotational stage is rotated;
- a fixed frame that is configured to remain stationary when the rotational stage is rotated; and
- a flexible circuit having one end attached to the shaft and another end connected to the fixed frame, wherein the flexible circuit is wound around the shaft with sufficient slack to allow free rotational movement of the rotation stage.

19. The optical probe system of claim 18, wherein the flexible circuit is configured to transmit electronic signals to control the first optical objective system to focus at the integrated circuit in the target device.

20. The optical probe system of claim 12, further comprising:
- a vertical translation stage configured to move the first optical objective system in a vertical direction substantially perpendicular to the sample plate, which allows the first optical objective system to focus at the integrated circuit in the target device.

21. The optical probe system of claim 12, further comprising:
- an x-y translation stage configured to move the first optical objective system in horizontal directions substantially parallel to the sample plate.

22. The optical probe system of claim 12, wherein at least two of the plurality of optical objective systems have different optical magnifications.

* * * * *